Patented Dec. 12, 1950

2,533,323

UNITED STATES PATENT OFFICE 2,533,323

PREPARATION OF ESTERS

John Lomartire, Cumberland, Md., assignor to Celanese Corporation of America, a corporation of Delaware No Drawing. Application June 21, 1947,
Serial No. 756,333

8 Claims. (Cl. 260—475)

This invention relates to the production of organic acid esters and relates more particularly to the preparation of the organic acid esters of 1,4-butanediol.

An object of this invention is the provision of an improved process for the production of organic acid esters of 1,4-butanediol by reacting tetrahydrofuran with an organic acid anhydride.

Other objects of this invention will appear from the following detailed description.

The cyclic compound tetrahydrofuran is produced in substantial quantities as a by-product of the partial oxidation of butane. The four-carbon chain renders it of great potential value for the synthesis of higher molecular weight organic compounds by reactions wherein the cyclic ring may be opened.

I have now found that the diesters of 1,4-butanediol may be obtained in high yield and purity if tetrahydrofuran is reacted with an organic acid anhydride at reflux temperature in a reaction mixture comprising tetrahydrofuran, an organic acid anhydride, pyridine and concentrated sulfuric acid. The reaction is effected most conveniently if the concentrated sulfuric acid is slowly added to a refluxing mixture of tetrahydrofuran, pyridine and the organic acid anhydride, and the reaction mixture formed then subjected to continuing reflux until the cyclic tetrahydrofuran ring is opened and the desired di-ester of 1,4-butanediol is formed.

The organic acid anhydride employed may be the anhydride of any suitable aliphatic, hydro-aryl or aromatic organic acid. Thus, in accordance with my novel process, I may employ, for example, acetic anhydride, propionic anhydride, butyric anhydride, crotonic acid anhydride, valeric anhydride, caproic anhydride, 2-ethyl-hexoic anhydride, capric anhydride, lauric anhydride, cyclohexyl-acetic anhydride, furoic acid anhydride, acrylic anhydride, benzoic anhydride, phenyl-acetic anhydride or phthalic anhydride to form the corresponding diesters. The esters which may be obtained, for example, are 1,4-butanediol-diacetate, 1,4-butanediol-dipropionate, 1,4-butanediol-dibutyrate, 1,4-butanediol-dicrotonate, 1,4-butanediol-divalerate, 1,4-butanediol-dicaproate, 1,4-butanediol-di-2-ethyl-hexoate, 1,4-butanediol-dicaprate, 1,4-butanediol-di-laurate, 1,4-butanediol-di-cyclohexyl-acetate, 1,4-butanediol-difuroate, 1,4-butanediol-di-acrylate, 1,4-butanediol-di-benzoate, 1,4-butanediol-di-phenyl-acetate and 1,4-butanediol-di-phthalate. In accordance with my novel process, mixed esters may be formed by employing mixed anhydrides.

The reaction mixture employed preferably contains from 1 to 2 mols of the acid anhydride for each mol of tetrahydrofuran present, together with from 0.06 to 0.4 mol of pyridine. A satisfactory catalytic effect is obtained by the addition of from about 0.2 to 0.6 mol of concentrated sulfuric acid to the above mixture. It is believed that the esterification reaction proceeds through the splitting of the tetrahydrofuran ring by the sulfuric acid present followed by esterification, the latter reaction being effected by the action of an acylating complex which is formed by the reaction of the acid anhydride with the pyridine present. This view of the reaction mechanism is, however, purely a theoretical one and I do not wish to be bound thereby.

The addition of the sulfuric acid catalyst to the refluxing mixture of tetrahydrofuran, acid anhydride and pyridine causes a gradual rise in the refluxing temperature and, when the addition of the desired amount of sulfuric acid is completed and maximum temperature has been reached, refluxing is continued for an additional period of time, usually for from 3 to about 6 hours. The reaction mixture is then cooled and the diester separated and purified by fractional distillation or any other satisfactory means.

In order further to illustrate my invention but without being limited thereto, the following example is given.

*Example*

A mixture comprising 1 mol of tetrahydrofuran, about 1.5 mols of acetic anhydride and about 0.1 mol of pyridine is heated to reflux temperature, i. e. about 93° C. and then 0.2 mols of sulfuric acid are gradually added to the refluxing reaction mixture. The temperature gradually rises with each addition and finally reaches about 143 to 144° C. Refluxing is continued at this latter temperature for 2 hours. The reaction mixture obtained is cooled and fractionated. A yield of 68% of 1,4-butanediol-diacetate is obtained.

It is to be understood that the foregoing detailed description is given merely by way of illustration and that many variations may be made therein without departing from the spirit of my invention.

Having described my invention, what I desire to secure by Letters Patent is:

1. Process for the production of diesters of 1,4-butanediol, which comprises refluxing a mixture of tetrahydrofuran, pyridine, an organic acid anhydride and sulfuric acid until the tetrahydrofuran ring is opened and a diester of 1,4-butanediol is formed, and fractionating the reaction mixture to separate the diester therefrom.

2. Process for the production of diesters of 1,4-butanediol, which comprises refluxing a mixture of tetrahydrofuran, pyridine, an aliphatic organic acid anhydride and sulfuric acid until the tetrahydrofuran ring is opened and a diester of 1,4-butanediol is formed, and fractionating the reaction mixture to separate the diester therefrom.

3. Process for the production of diesters of 1,4-butanediol, which comprises refluxing a mixture of tetrahydrofuran, pyridine, an aromatic organic acid anhydride and sulfuric acid until the tetrahydrofuran ring is opened and a diester of 1,4-butanediol is formed, and fractionating the reaction mixture to separate the diester therefrom.

4. Process for the production of 1,4-butanediol-diacetate, which comprises refluxing a mixture of tetrahydrofuran, pyridine, acetic anhydride and sulfuric acid until the tetrahydrofuran ring is opened and 1,4-butanediol-diacetate is formed, and fractionating the reaction mixture to separate the 1,4-butanediol-diacetate therefrom.

5. Process for the production of diesters of 1,4-butanediol, which comprises refluxing a mixture comprising one mol of tetrahydrofuran, from 0.06 to 0.4 mol of pyridine, from 1 to 2 mols of an organic acid anhydride and from 0.2 to 0.6 mol of sulfuric acid until the tetrahydrofuran ring is opened and a diester of 1,4-butanediol is formed, and fractionating the reaction mixture to separate the diester therefrom.

6. Process for the production of diesters of 1,4-butanediol, which comprises refluxing a mixture comprising one mol of tetrahydrofuran, from 0.06 to 0.4 mol of pyridine, from 1 to 2 mols of an aliphatic organic acid anhydride and from 0.2 to 0.6 mol of sulfuric acid until the tetrahydrofuran ring is opened and a diester of 1,4-butanediol is formed, and fractionating the reaction mixture to separate the diester therefrom.

7. Process for the production of diesters of 1,4-butanediol, which comprises refluxing a mixture comprising one mol of tetrahydrofuran, from 0.06 to 0.4 mol of pyridine, from 1 to 2 mols of an aromatic organic acid anhydride and from 0.2 to 0.6 mol of sulfuric acid until the tetrahydrofuran ring is opened and a diester of 1,4-butanediol is formed, and fractionating the reaction mixture to separate the diester therefrom.

8. Process for the production of 1,4-butanediol-diacetate, which comprises refluxing a mixture comprising one mol of tetrahydrofuran, from 0.06 to 0.4 mol of pyridine, from 1 to 2 mols of acetic anhydride and from 0.2 to 0.6 mol of sulfuric acid until the tetrahydrofuran ring is opened and 1,4-butanediol-diacetate is formed, and fractionating the reaction mixture to separate the 1,4-butanediol-diacetate therefrom.

JOHN LOMARTIRE.

REFERENCES CITED

The following references are of record in the file of this patent:

UNITED STATES PATENTS

| Number | Name | Date |
| --- | --- | --- |
| 2,167,132 | Weisz | July 25, 1939 |
| 2,314,454 | Munchen et al. | Mar. 23, 1943 |

OTHER REFERENCES

Paul—Bull. Soc. Chim. 5th series, vol. 6, pages 1162–1173 (1939). Wilson—Reactions of Furans Compounds—J. Chem. Soc. (London), pages 48–51 (1945).